April 25, 1950    J. DEKETH    2,505,465
SURGE PROTECTED ALTERNATING-CURRENT VACUUM TUBE METER
Filed May 3, 1946
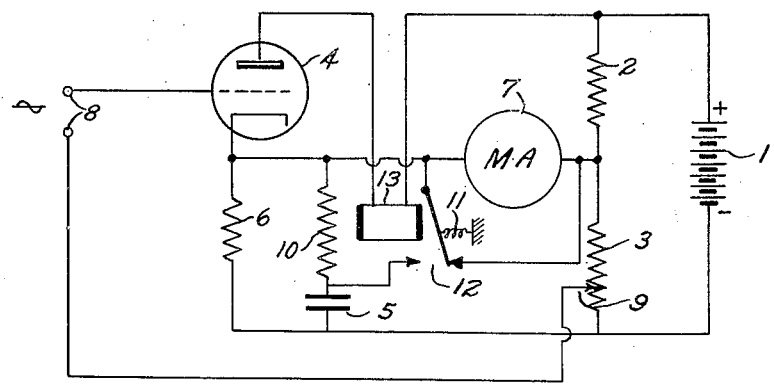
INVENTOR
JAN DEKETH
BY [signature]
AGENT Patented Apr. 25, 1950

2,505,465

UNITED STATES PATENT OFFICE 2,505,465

SURGE PROTECTED ALTERNATING-CURRENT VACUUM TUBE METER

Jan Deketh, Eindhoven, Netherlands, assignor, by mesne assignments, to Hartford National Bank and Trust Company, Hartford, Conn., as trustee Application May 3, 1946, Serial No. 666,910
In the Netherlands February 25, 1942

Section 1, Public Law 690, August 8, 1946
Patent expires February 25, 1962

6 Claims. (Cl. 171—95)

For measuring alternating voltages in which a small amount of energy only may be derived from the source of supply, use is frequently made of a vacuum tube voltmeter comprising an amplifying tube arranged as an anode detector, the voltage to be measured being supplied to the control grid of the tube. In practice such vacuum tube voltmeters are sometimes also used for measuring direct voltages.

In such tube voltmeters the control grid bias voltage required, which has a comparatively high value, is usually derived at least in part from a resistance included in the cathode lead of the tube, the alternating voltage to be measured being applied between the control grid and that extremity of the cathode resistance which is remote from the cathode. The said cathode resistance which thus forms part of the input circuit of the tube voltmeter must then be bridged by a condenser having a capacity such that the R. C.-time of the parallel circuit is great relative to the duration of the period of the lowest frequency to be measured. Use may be made, for example, of a condenser of about 8 microfarads.

A conventional tube voltmeter of the type described has the drawback of being unsuitable for measuring comparatively high alternating voltages, for example alternating voltages having a maximum instantaneous value of 150 volts or higher.

According to the invention, the said drawback in such tube voltmeters is avoided by including a high-ohmic resistance of, for example, 100,000 to 500,000 ohms in the input circuit of the tube voltmeter and in series with the condenser which bridges the cathode resistance of the tube.

The invention is based on the recognition of the fact that in the conventional tube voltmeters, immediately after a high alternating voltage to be measured has been applied at the input terminals, the control grid during a short time periodically acquires so high a positive potential relative to the cathode that a very high current or even breakdown phenomena occur between the said two electrodes, as a result of which the cathode is deteriorated and many drawbacks are involved.

By the use of a high-ohmic resistance connected in accordance with the invention, excessive currents and breakdown phenomena and hence deterioration of the cathode are avoided, since now the grid current which always begins to flow prior to the occurrence of the excessive current or breakdown phenomena brings about such a voltage drop across the high-ohmic resistance that the grid can at most exhibit a small positive potential relative to the cathode, which cannot do any harm.

The high-ohmic resistance may be included, for example, in the conductor which connects the control grid of the tube to the input terminal concerned. In carrying out measurements this high-ohmic resistance, together with the grid-cathode capacity of the tube acts, however, as a voltage divider so that with high frequencies, at which the grid-cathode capacity has s small reactance, a considerable attenuation of the signal to be measured occurs which is, in addition, variable with frequency. In view thereof the high-ohmic resistance is preferably connected in series with the by-pass condenser, the series-connection thus obtained being in parallel to the cathode resistance of the tube.

After the measuring voltage has been applied, the bridging condenser of the cathode resistance after expiration of a period of time determined by the resistance and the capacity of the input circuit will be charged approximately up to the voltage corresponding to the measuring voltage. As a matter of fact, after expiration of this period, excessive currents or breakdown phenomena between the control grid and the cathode cannot occur. Since in this case the high-ohmic resistance may be dispensed with and the latter brings about a measuring error which varies with frequency, the high-ohmic resistance is preferably switched off some time after the application of the measuring voltage and prior to carrying out the measurement proper, this switching out being effected, for example, with the aid of a resilient short-circuit switch which is open in the position of rest. With very low measuring voltage frequencies there occurs in general an additional condenser charging current and thus also a grid current when the resistance is short-circuited. This grid current may be limited, if desired, by intermittently short-circuiting the resistance.

The invention will be more clearly understood and readily carried into effect with reference to the accompanying drawing showing, by way of example, one advantageous form of construction of a vacuum tube voltmeter according to the invention.

In the tube voltmeter in bridge connection which is shown in the drawing the supply voltage is taken from a battery 1, one branch of the bridge being constituted by resistances 2 and 3 and the other by a triode 4 containing an indirectly heated cathode and a cathode resistance 6 bridged by a paper condenser 5. A sensitive ammeter 7 is included in the measuring diagonal of the bridge connection. The alternating voltage to be measured may be supplied to input terminals 8 which are connected directly to the control grid of the triode 4 and to a tapping point 9 of the resistance 3. The voltage drops produced at the resistance 6 and at the lower part of the resistance 3 which is located in the input circuit jointly provide the control-grid negative grid voltage for the triode. The voltages set up at the resistances 6 and 3 are of opposite directions and so chosen that the triode is biased approximately to cut off and operates as an anode detector. In operation, an alternating voltage applied to the control grid will give pulses of plate current on the positive half cycles and no current on the negative half cycles.

According to the invention, for the purpose of avoiding excessive currents between the control grid and the cathode of the triode 4 when a high alternating voltage to be measured is suddenly applied, the condenser 5 has connected in series with it a high-ohmic protective resistance 10 which may be short-circuited before reading the meter 7, with the aid of a switch 12 which is normally open through the action of a spring 11. To avoid erroneous readings, it is advantageous if the switch in the position of rest short-circuits the measuring instrument.

It is evident that the closing of the switch 12 some time (for example 2 to 4 secs.) after applying the alternating voltage to be measured may be effected automatically with the aid of means known per se, for example with the aid of a relay 13 included in the cathode or anode conductor of the triode. The invention is, of course, also applicable to vacuum tube voltmeters in which a tube having a plurality of grids is used instead of the triode 4.

What I claim is:

1. A vacuum tube arrangement comprising a vacuum tube having a cathode, a control grid and an anode, a bias resistance, a bypass capacitance, a protective resistance, said capacitance being connected in series with said protective resistance across said bias resistance, means to apply a voltage to be measured to said grid and through said bias resistance to said cathode, said bias resistance having a value at which said tube operates as an anode detector, said protective resistance having a value such that upon the application of said voltage to be measured and prior to the attainment of a charge on said capacitance a safety bias is developed across said protective resistance, and direct-current indicating means coupled to the output of said anode detector.

2. A vacuum tube voltmeter arrangement comprising a vacuum tube having a cathode, a control grid and an anode, a bias resistance, a bypass capacitance connected across said bias resistance, a sorce of anode potential connected to said anode and through said bias resistance to said cathode, means to apply a voltage to be measured to said grid and through said bias resistance to said cathode, said bias resistance having a value at which said tube operates as an anode detector, direct-current indicating means coupled to the output of said anode detector, a protective resistance, and switching means for connecting said protective resistance in series with said capacitance, said protective resistance having a value such that upon the application of a voltage to be measured and prior to the attainment of a charge on said capacitance a safety bias is developed across said protective resistance.

3. A vacuum tube voltmeter arrangement comprising a vacuum tube having a cathode, a control grid and an anode, a bias resistance, a bypass capacitance, a protective resistance, said capacitance being connected in series with said protective resistance across said bias resistance, a source of anode potential connected to said anode and through said bias resistance to said cathode, means to apply a voltage to be measured to said grid and through said bias resistance to said cathode, said bias resistance having a value at which said tube functions as an anode detector, said protective resistance having a value at which upon the application of a voltage to be measured and prior to the attainment of a charge on said capacitance a safety bias is developed across said protective resistance, a direct current indicator coupled to the output of said anode detector, and switching means for selectively in a first position shorting said indicator and in a second position shorting said protective resistance.

4. A vacuum tube voltmeter arrangement comprising a vacuum tube having a cathode, a control grid and an anode, a bias resistance, a bypass capacitance, a protective resistance, said capacitance being connected in series with said protective resistance across said bias resistance, an electromagnetic relay, a source of anode potential connected through said relay to said anode and through said bias resistance to said cathode, means to apply a voltage to be measured to said grid and through said bias resistance to said cathode, said bias resistance having a value at which said tube functions as an anode detector, a direct-current indicator coupled to the output of said anode detector, and switching means for selectively in a first position shorting said indicator and in a said position shorting said protective resistance, said switching means being maintained normally in said first position, said relay being arranged to actuate said switching means after a predetermined time interval.

5. A vacuum tube voltmeter arrangement comprising a vacuum tube having a cathode, a control grid and an anode, a bias resistance, a bypass capacitance, a protective resistance, said capacitance being connected in series with said protective resistance across said bias resistance, a source of anode potential connected to said anode and through said bias resistance to said cathode, means to apply a voltage to be measured to said grid and through said bias resistance to said cathode, said bias resistance having a value at which said tube functions as an anode detector, a first and second resistance connected in series across said potential source, a direct-current indicator connected between the junction of said first and second resistance and said cathode, said first and second resistances having values such as to constitute with said bias resistance and said tube a bridge circuit, and switching means for selectively in a first position shorting said indicator and in a second position shorting said protective resistance.

6. A vacuum tube voltmeter arrangement comprising a vacuum tube having a cathode, a control grid and an anode, a bias resistance, a bypass capacitance, a protective resistance, said capacitance being connected in series with said protective resistance across said bias resistance, an electromagnetic relay, a source of anode potential connected through said relay to said anode and through said bias resistance to said cathode, said bias resistance having a value at which said tube functions as an anode detector, a first resistance, a second resistance having an adjustable tap, said first and second resistances being connected across said potential source and constituting with said tube and said bias resistance a bridge circuit, means to apply a voltage to be measured between said grid and said adjustable tap, a direct-current indicator connected between the junction of said first and second resistances and said cathode, and switching means for selectively in a first position shorting said indicator and in a second position shorting said protective resistance, said switching means being maintained normally in said first position, said relay being arranged to actuate said switching means after a predetermined time interval.

JAN DEKETH.

REFERENCES CITED

The following references are of record in the file of this patent:

UNITED STATES PATENTS

| Number | Name | Date |
| --- | --- | --- |
| 2,367,746 | Williams, Jr | Jan. 23, 1945 |

OTHER REFERENCES

Vacuum Tube Voltmeters, Rider (1941, J. F. Rider Publisher, Inc.), Figures 5-6, page 77, and Figures 7-3, page 95.